March 9, 1943.　　　　J. LOBSTEIN　　　　2,313,492
ELECTRIC HEATING APPARATUS FOR ALL APPLICATIONS
Filed Dec. 19, 1939　　　2 Sheets-Sheet 1
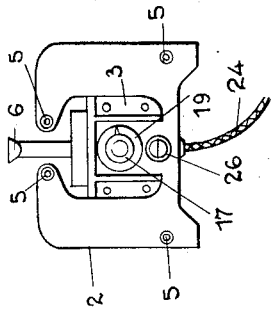
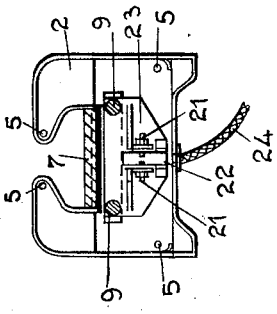
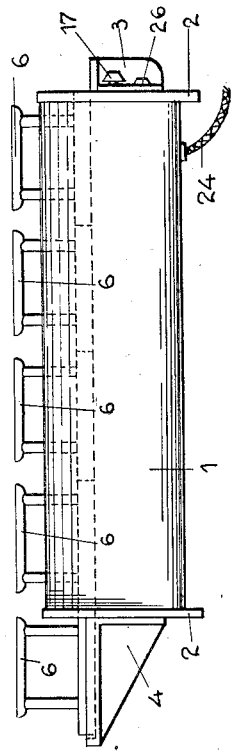
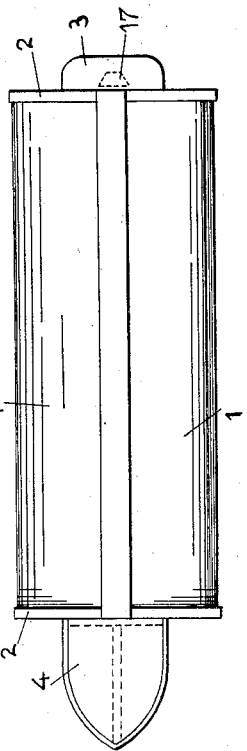
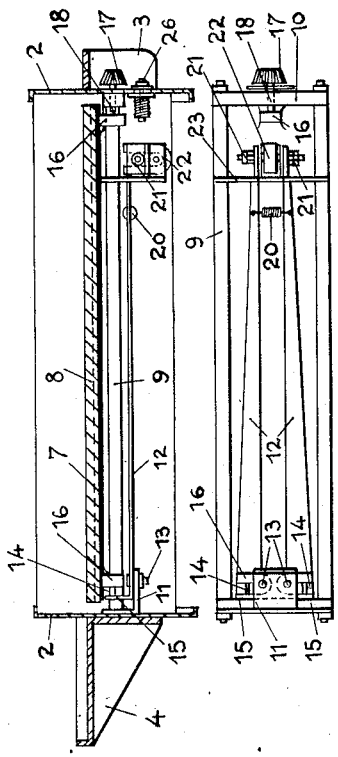
INVENTOR:
JEAN LOBSTEIN
BY: Haseltine, Lake & Co.
ATTORNEYS March 9, 1943.   J. LOBSTEIN   2,313,492
ELECTRIC HEATING APPARATUS FOR ALL APPLICATIONS
Filed Dec. 19, 1939   2 Sheets-Sheet 2
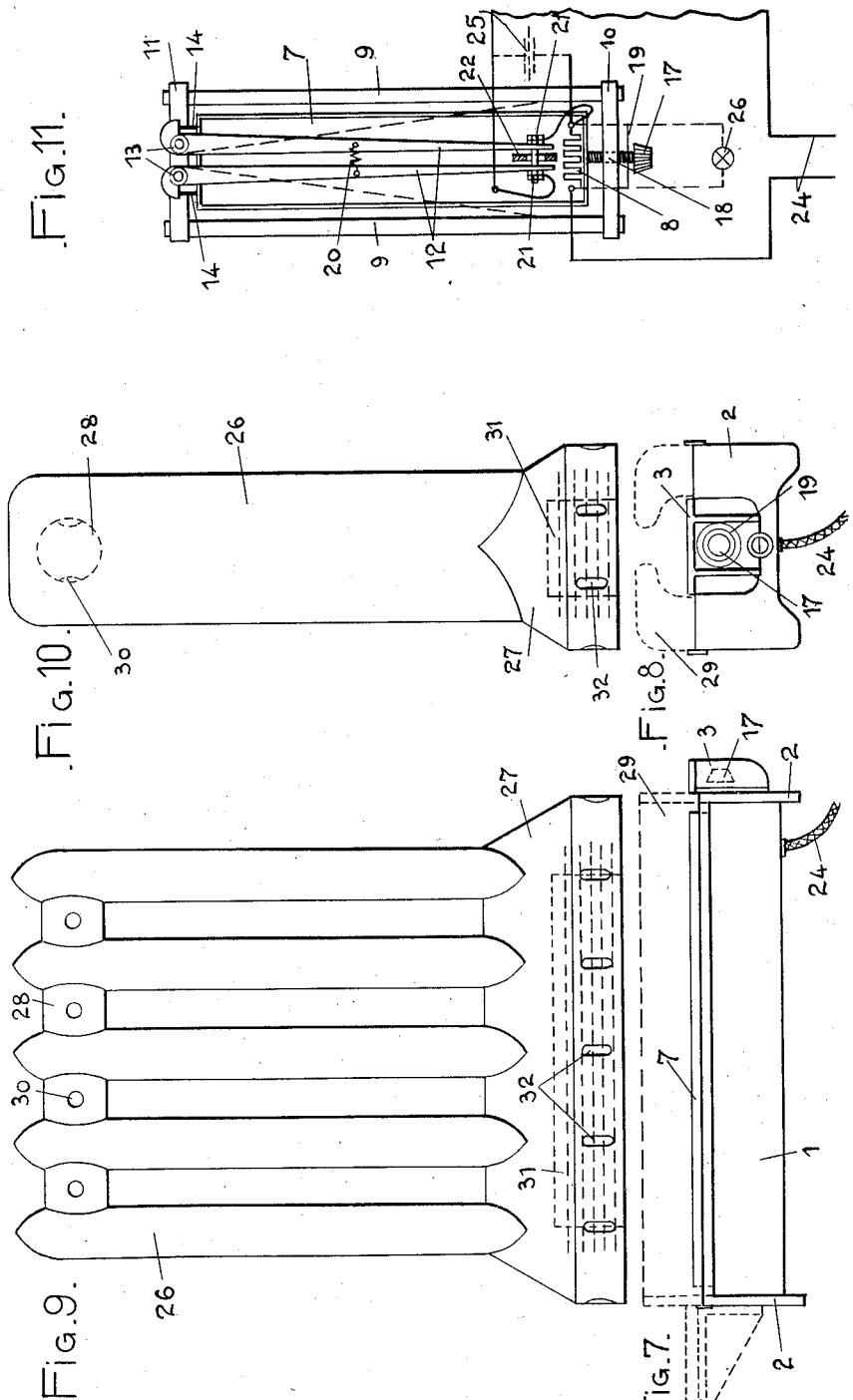

Patented Mar. 9, 1943

2,313,492

UNITED STATES PATENT OFFICE 2,313,492

ELECTRIC HEATING APPARATUS FOR ALL APPLICATIONS

Jean Lobstein, Paris, France; vested in the Alien Property Custodian

Application December 19, 1939, Serial No. 309,951
In France December 22, 1938

2 Claims. (Cl. 219—22)

The present invention has for object improvements in electric heating apparatus, which can comprise means for automatically controlling the temperature, for all applications and in particular for flat irons, tools and various utensils.

When use is made of an electric stove or hot-plate for heating flat irons, tools and various utensils, several inconveniences are encountered which prevent this method of heating from being more frequently used. In the case of flat irons for instance, the temperature of the irons is a function of the time during which the iron has been in contact with the hot-plate and it can be admitted that the iron can be brought to a temperature approximating that of the plate if it has remained in contact therewith for a sufficiently long time. The temperature of the irons is also function of the temperature of the plate, and if said plate is not provided with a device for controlling the temperature, its temperature varies within wide limits according to the conditions of utilisation. Finally, the results obtained with said hot-plate are no better (apart from the question of cleanness) than those obtained with a coal stove or a gas-stove.

The present invention is particularly adapted to remedy the aforementioned inconveniences and the improved apparatus forming the subject-matter thereof, is mainly characterised by the combination in one and the same unit, of a main frame or casing, a hot-plate as a rule long and narrow, means for electrically heating the plate, and an automatic device for controlling the temperature of said plate.

In a particular embodiment, especially for the heating of flat irons, the long and narrow hot-plate forms, with the upper lateral parts of the frame constituting a case, a longitudinal channel freely opening at its ends and in which the irons are arranged in a single file.

Preferably, the upper part of the longitudinal channel is narrower than the lower part.

The apparatus can obviously comprise a plurality of longitudinal parallel and juxtaposed channels without departing from the scope of the invention.

In the particular case in which the improved apparatus is devised for heating ordinary flat irons, the latter are placed one behind the other in the corresponding channel and on the hot-plate, the cold irons being successively engaged at one end of the channel and the hot irons removed, also successively, at the other end of the channel.

By giving the hot-plate a sufficient length and by combining therewith an adjustable thermostat, at the outlet end of the channel, irons can be obtained at the desired temperature and it is possible to continuously supply one or more persons working simultaneously.

The invention also includes the combination, with the apparatus previously defined in its main feature, of means constituted, in particular:

Either by a radiator element fitting over the apparatus so as to ensure a supply of hot air at a temperature adjustable by means of the thermostat, Or by a heat insulated enclosure or cover fitting over the apparatus and thus constituting a stove, an oven or a water-heater of adjustable temperature.

The invention also includes in its scope and by way of new industrial products:

The apparatus such as defined in the main feature for multiple uses and even as electric oven or stove of adjustable temperature, The apparatus such as defined, in the case flat irons are used, with or without a thermostat, The apparatus as defined in the main claim and which is combined with upper lateral parts capable of being taken to pieces for allowing the utilisation thereof for heating flat irons or for any other uses when said parts are taken to pieces, The radiator element fitting on the apparatus, The heat insulated cover or the like fitting on the apparatus for constituting a stove, an oven or a water-heater.

The invention also includes various particular points applied separately or in any combinations:

(a) A thermostatic adjusting device so devised that the expansible member of the thermostat is constituted by the hot-plate itself, the variations of length of which, under the effect of expansion or of contraction, are transmitted to a make-and-break contact by the action of suitable amplifying levers.

(b) The hot-plate includes a heating element of the tubular or armoured type arranged in said plate forming ingot-mold, a metal or metal alloy being cast so as to completely encase the heating element and to ensure an excellent transmission of heat from the element to the plate.

(c) The heating element of the tubular type is housed in grooves provided in the hot-plate which is then made in two parts assembled by screws or by any other means, and the hot-plate can also comprise a tubular heating element directly embedded in the hot-plate when it is cast, or a heating element mounted on mica and clamped between two metal plates constituting the hot-plate.

(d) For easily controlling the temperature of the hot-plate, use is made of a pilot lamp, an optical or accoustical signal (bell for instance), the lamp for instance being lighted during the heating of the plate and extinguished when the plate has reached the desired temperature.

(e) In the case of flat irons for instance, the apparatus is inclined on a support in the direction in which the irons advance on the hot-plate, and this in order to reduce to the minimum the effort necessary for pushing the train of irons.

The invention also includes other particular points which will appear in the following text given with reference to the accompanying drawings, by way of example only and in which:

Fig. 1 is a longitudinal elevation of an improved apparatus devised according to the invention.

Fig. 2 is an end view of the apparatus seen from the admission side for the irons.

Fig. 3 is a plan view the irons being removed.

Fig. 4 is a longitudinal section of the apparatus.

Fig. 5 is a cross section.

Fig. 6 is an underside view showing a particular embodiment of the thermostat.

Fig. 7 is a longitudinal elevation of the apparatus utilised as hot-plate for other uses.

Fig. 8 is a cross sectional elevation for the same utilisation.

Fig. 9 is an elevation of a casing which can be mounted on the improved apparatus for constituting a hot air radiator of adjustable temperature.

Fig. 10 is a side view of the same casing forming a radiator.

Fig. 11 is a general diagram of the hot-plate in combination with the thermostat illustrated in Fig. 6.

At the beginning of this description reference will in particular be made to the apparatus illustrated in Figs. 1 to 6 and which is especially devised for heating ordinary flat irons.

The general frame 1, which has the shape of a case, is made of incombustible material and it can be provided with a heat insulating covering in order to avoid loss of calories. The case 1 forms a channel the upper edges of which are brought near together so as to constitute a tunnel longitudinally slotted at its top part. In this channel or tunnel can be successively engaged, at one end, the tools such as flat irons 6.

The sole of said heating tunnel is constituted by the hot-plate 7 in which is embedded the heating element 8 fed with current from a source of electric energy by means of a flexible wire 24.

The case 1 is closed at its ends by metal cheek members 2 united by tie-rods 5, the whole thus forming a rigid and strong frame. On the cheek member 2 (entrance side) is secured a member 3 forming a small platform for facilitating the introduction of the irons and tools and thus constituting a hood protecting the adjusting knob 17 of the thermostat. The cheek member 2 (outlet side) carries a platform 4 which receives, for instance, the hot iron when an iron to be reheated is introduced at the other end and when the other irons 6 are pushed along.

In the circuit supplying current to the hot-plate 7 is inserted a thermostat the expansible member of which is directly subjected to the action of the temperature of said plate 7.

Fig. 6 shows a thermostat which has been particularly studied in order to obtain good sensitiveness at the same time as a high cutting-off capacity, and in which the expansible member is constituted by the hot-plate 7 itself. Said thermostat is composed of a rigid framework formed by bars 9 and cross members 10 and 11; these various members which are arranged so as to receive the least possible heat from the hot-plate 7, are made of metal which is not very expansible.

The hot-plate 7 rests at a few points on the bars 9 and the underside of said plate is provided with bosses 16 one of which is in contact with the screw 18 of the adjusting knob 17 whereas the other two, through the medium of claws 14, are in contact with the bent portions 15 of amplifying levers 12 pivoted at 13. The pivot pins 13 are mounted in the cross member 11 and the ends of the levers 12 carry contacts 21 arranged between the branches of a magnet 22; a coil spring 20 acts to bring the levers 12 towards each other, which levers are guided by the member 23.

Use can also be made of a thermostat of a known type, acting either by the expansion of metals or of liquids, or of the distortion type known under the name of two blade thermostats, the latter control the temperature of the hot-plate by conduction or by radiation.

These thermostats can be of the type having dry contacts with a mechanical or magnetic (magnet) device rapidly breaking and making the circuit, or they can use a mercury switch, the latter device being more particularly used in the case of a high power hot-plate.

The case 1 can be constructed, as shown in Figs. 7 and 8, with the upper part 29 which can be taken to pieces, this allowing to use the apparatus as hot-plate with automatic control of the temperature for multiple uses, this form of construction being very advantageous.

By arranging, for instance, on said hot-plate, a light metallic casing in the form of a radiator, Figs. 9 and 10, a hot air radiator can be obtained which is capable of supplying hot air at the desired temperature and adjustable at will by the action of the thermostat.

The hot-plate can also be used for heating members and tools to a chosen temperature and also for heating varnish, glues and delicate products which must not be heated beyond a certain temperature.

By placing on the hot-plate a metallic casing carefully heat insulated on the faces which are not arranged opposite the plate 7, a stove is obtained the temperature of which will be automatically maintained at the chosen value.

The above stove can be replaced by a heat insulated vessel, vat, etc., constituting a water-heater the temperature of which is easily adjustable.

As kitchen-stove, the automatic adjustment of the temperature of the hot-plate will be appreciated, hot-plate on which can be used vessels and utensils of square or rectangular shape with rounded angles in order to use the entire heating surface to the best advantage. Very numerous applications can also be contemplated in addition to those previously indicated by way of example only.

Fig. 11 shows a diagram of the thermostat illustrated in Fig. 6 and the operation of which will be described later on.

One of the supply wires 24 leads to one of the ends of the heating element 8, which, for greater clearness, occupies only a small part of the hot-plate whereas it occupies in reality the entire surface. The other supply wire 24 leads to the other end of the heating element 8 and passes through contacts 21 mounted at the end of amplifying levers 12. In the case when direct current is used, a small condenser 25 is branched between the contacts 21 for reducing the breaking arc to a suitable value.

Finally, the invention provides the use of a thermostat which can comprise a plurality of levers arranged in such a manner that their own amplifications are multiplied for imparting to the thermostat the greatest sensitiveness which might be useful.

The operation of the apparatus previously described is as follows:

The apparatus illustrated in Fig. 1 being connected to a source of electricity, the flat irons, for instance, are placed one behind the other and without intervals in order to use the entire surface of the hot-plate 7. The knob 17 of the thermostat is placed on the indication of the desired temperature; the irons in contact with the hot-plate are heated by conduction up to the value determined by the thermostat which cuts off the current as soon as said temperature is reached.

A small lamp 26 can be used as optical signal for indicating that the irons are being heated (thermostat closed, lamp lighted) or that they have reached the desired temperature (thermostat open, lamp extinguished), a visible signal or a bell can be used for the same purpose.

When beginning the work, is suffices to introduce a cold iron on the inlet side by pushing the entire train of irons, to obtain at the outlet side, a hot iron which comes on to the platform 4 and so on, as long as is necessary. The effort required for pushing a file of four or five irons on a smooth hot-plate is not very great, but it is very simple to still further reduce the same, by inclining the apparatus towards the outlet.

By its principle and without possible error, the apparatus always gives at the outlet side, the iron which has remained for the longest period of time on the hot-plate and, consequently, an iron the temperature of which is very near that of said plate.

In order to be effective, the thermostat must have its member sensitive to heat in direct contact with the hot-plate, this necessity does not allow of using certain types of thermostats the operating temperature of which can scarcely exceed 250 or 300 degrees C.

The thermostat previously described constitutes an important point of the present invention, as it uses as expansible member the hot-plate itself; its operation is as follows:

The hot-plate being cold, the levers 12 are restored by the spring 20 and the contacts 21 are pressed one against the other by the combined action of the spring 20 and of the magnet 22, this allowing the current to pass. As the plate heats up its length increases and the bosses 16 press against the adjusting screw 18, on the one hand, and on the end of the amplifying levers 12 on the other hand. As the adjusting screw 18 cannot move, the claws 14 exert their thrust on the end 15 of the levers 12 until said thrust is greater than the force exerted by the spring 20 and the magnet 22. Under the lagging effect of the magnet, the separation of the contacts is very rapid, this condition being necessary for ensuring a satisfactory maintenance of the contacts.

The current being cut off, the hot-plate gradually cools; the levers 12 urged by the spring 20 move near each other until the magnet rapidly presses the contacts 21 one against the other, closing thereby the circuit for ensuring a further heating up of the plate, and so on.

A member 23 acting as guide, ensures the perfect covering of the contacts 21 and a condenser 25 is utilised when direct current is used for absorbing the energy, especially at the breaking.

It can also be contemplated to control, by means of the amplifying levers 12 or by a plurality of levers the amplifications of which are multiplied, a mechanical switch of the tumbler type or a mercury switch and, in the latter case, it is not necessary to provide a condenser 25 for using the apparatus with direct current.

The adjusting knob 17 moves opposite a dial 19 graduated in degrees centigrade and corresponding to the temperature of the upper face of the hot-plate 7.

The upper face of the metallic hot-plate is perfectly smooth for ensuring a good contact and good transmission of heat to the irons, tools or utensils utilising said plate.

The invention also includes the construction of a hot-plate in which the heating element is sheltered from air and transmits its heat to the entire hot-plate in the best conditions.

For obtaining this result, the heating element used is of a type known as tubular or armoured heating element which includes, as is known, a heating body placed in the center of a metal tube, the free space between the heating body and the tube being filled with an electric insulating medium which is a good conductor of heat. The hot-plate constructed according to the invention includes a first hollow metal plate forming ingot-mould; the tubular heating element suitably folded on itself is placed in said ingot-mould, which is then filled with a metal or metal alloy cast in special conditions, in order to ensure perfect transmission of heat between the heating element and the plate. The inactive face of the plate is insulated by means of heat insulating material reducing to the minimum the thermal losses of the hot-plate.

A second embodiment provides a metallic hot-plate made in two parts assembled together by screws or by any other means. Grooves are provided in the opposite faces of the plates and the tubular heating element occupies said grooves in which it is powerfully clamped when the plates are assembled together.

The two above embodiments are included in the present invention which moreover contemplates the use of tubular heating elements directly embedded in the plate upon casting, or again, of heating elements wound on mica and clamped between two metal plates according to the known method.

The casing constituting the case of the apparatus has a double wall with a space filled with air or heat insulating material, reducing to the minimum the thermal losses of the apparatus. For the utilisation of the hot-plate for heating tools and various utensils it is simply necessary to take the upper part 29 of the case 1 to pieces, Figs. 7 and 8, or to replace it by another member of suitable shape.

The operation of the hot-plate as a radiator will be easily understood by referring to Figs. 9 and 10.

On the hot-plate 7 is placed a metal case 31 provided with fins and the function of which is to promote the transmission of heat between the hot-plate and the surrounding air. This heat exchanger allows of improving the operation of the hot-plate as radiator. By covering the case 1 and the exchanger 31 with the metal casing 26 in the form of a radiator, an apparatus is obtained of greater efficiency, in which the circulation of air takes place in a very rational manner. This metal casing 26 acts in fact as a chimney. The air to be heated, sucked by the lower orifices 32, sweeps over the fins of the exchanger 31 and then escapes through the openings 30. It suffices to manipulate the knob 17 of the thermostat for modifying at will the output of hot air of the apparatus and the temperature of said air.

The apparatus illustrated in Fig. 1 comprises four irons in course of heating, but it might just as well comprise a greater number, if several workers ironing at the same time are to be continuously supplied.

It is obvious that the embodiments described and illustrated are given herein only by way of indication and not in a limiting sense. All modifications or changes which do not alter in any way the main features above set forth or the desired result, remain included in the scope of the present invention.

What I claim as my invention and desire to secure by Letters Patent is:

1. In an electric heating apparatus especially adapted for heating flat irons and having a frame, heating means and control means for automatically controlling the temperature produced by the latter, the combination of longitudinally extended hot plate means of sufficient length to allow said heater to receive a series of flat irons simultaneously in a row on said hot plate means and disposed in a position to be heated by said heating means, means for further adding to the length of said apparatus including a platform at the outlet end of the apparatus in line with and on the level of said hot plate means allowing irons to be pushed out off the latter upon said platform, and a second platform disposed at the entrance end of said apparatus in line with, and on the level of, the hot plate means to facilitate introduction of flat iron onto the hot plate means, and a manual adjusting means for adjusting the temperature control means having a manual adjusting knob disposed upon said end of the apparatus beneath said second platform in a position to be effectively shielded and protected from damage by said second platform.

2. In an electric heating apparatus especially adapted for heating flat irons and having a frame, heating means and control means for automatically controlling the temperature produced by the latter, the combination of longitudinally extended hot plate means of sufficient length to allow said heater to receive a series of flat irons simultaneously in a row on said hot plate means and disposed in a position to be heated by said heating means, the temperature control means including a thermostat utilizing the hot plate means as the expansible member thereof, make and break contact means in the apparatus below said hot plate means, and two amplifying levers pivoted a distance from said contact means with one end of each in mechanical contact with a portion upon said hot plate means so as to be responsive to expansion of the same due to heat and swingable about their respective pivots, the other ends of said levers being swingable simultaneously inward toward or outward from said make and break contact according to expansion or contraction of said hot plate means.

JEAN LOBSTEIN.